US008844030B2

(12) United States Patent
Yoo

(10) Patent No.: US 8,844,030 B2
(45) Date of Patent: Sep. 23, 2014

(54) ANTI-VIRUS PROTECTION SYSTEM AND METHOD THEREOF

(75) Inventor: InSeon Yoo, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 258 days.

(21) Appl. No.: 12/950,311

(22) Filed: Nov. 19, 2010

(65) Prior Publication Data

US 2011/0126287 A1     May 26, 2011

(30) Foreign Application Priority Data

Nov. 20, 2009    (KR) ........................ 10-2009-0112375
Nov. 20, 2009    (KR) ........................ 10-2009-0112376

(51) Int. Cl.
     *H04L 29/06*      (2006.01)

(52) U.S. Cl.
     CPC ........ *H04L 63/1408* (2013.01); *H04L 63/1441* (2013.01)
     USPC ............................................. 726/22; 726/24

(58) Field of Classification Search
None
See application file for complete search history.

(56) References Cited

U.S. PATENT DOCUMENTS

| | | | |
|---|---|---|---|
| 6,256,498 B1 | 7/2001 | Ludwig | |
| 7,149,219 B2* | 12/2006 | Donahue | 370/392 |
| 7,346,928 B1 | 3/2008 | Muhlestein | |
| 7,949,329 B2* | 5/2011 | Benco et al. | 455/414.1 |
| 2002/0042886 A1* | 4/2002 | Lahti et al. | 713/201 |
| 2002/0178381 A1 | 11/2002 | Lee et al. | |
| 2003/0217173 A1* | 11/2003 | Butt et al. | 709/237 |
| 2004/0128346 A1* | 7/2004 | Melamed et al. | 709/203 |
| 2005/0235044 A1* | 10/2005 | Tazuma | 709/217 |
| 2005/0246711 A1* | 11/2005 | Berstis et al. | 718/105 |
| 2006/0013191 A1* | 1/2006 | Kavanagh | 370/349 |
| 2006/0209809 A1 | 9/2006 | Ellingham et al. | |
| 2007/0039053 A1* | 2/2007 | Dvir | 726/24 |
| 2007/0094351 A1* | 4/2007 | Kalish et al. | 709/218 |
| 2008/0083031 A1 | 4/2008 | Meijer et al. | |

FOREIGN PATENT DOCUMENTS

| | | |
|---|---|---|
| EP | 1302869 A1 | 4/2003 |
| JP | 2002-091843 A | 3/2002 |
| JP | 2002-197006 A | 7/2002 |
| JP | 2002-358253 A | 12/2002 |
| KR | 10-0794136 B1 | 1/2002 |
| KR | 10-2006-0099457 A | 9/2006 |
| KR | 10-2009-0093187 A | 9/2009 |
| WO | WO 2007-015254 A2 | 2/2007 |

OTHER PUBLICATIONS

Communication issued Oct. 19, 2011, by the European Patent Office in corresponding Application No. 10191876.1.
European Search Report dated May 2, 2012 in counterpart European Application No. 10191876.
Communication from the Japanese Patent Office dated Dec. 25, 2012, in a counterpart application No. 2010-258589.

\* cited by examiner

*Primary Examiner* — Benjamin Lanier
(74) *Attorney, Agent, or Firm* — Sughrue Mion, PLLC

(57) ABSTRACT

An anti-virus protection system and method including receiving an address of a data server from a user, writing and transmitting a request message including the address received from the user, receiving the data from the data server, and determining whether the data contains malignant virus. Thus, a malignant web site is scanned/filtered by minimally using a restrictive memory and central process unit (CPU) resource of a mobile device, and a user uses a mobile device whose security is ensured even through a user moves to another country.

9 Claims, 6 Drawing Sheets

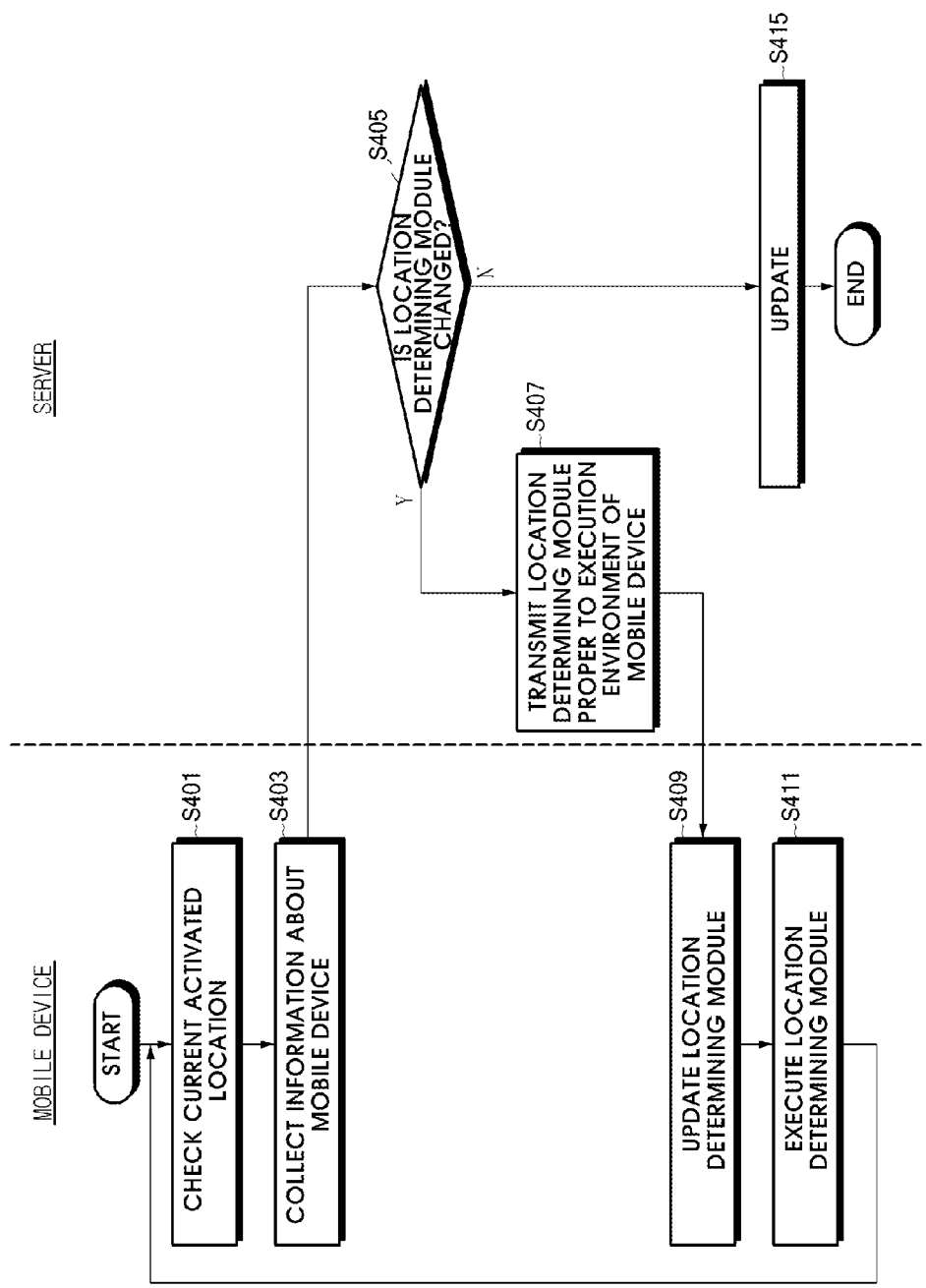

ANTI-VIRUS PROTECTION SYSTEM AND METHOD THEREOF

CROSS-REFERENCE TO RELATED PATENT APPLICATION

This application claims the benefit of Korean Patent Application No. 10-2009-0112375, filed on Nov. 20, 2009 and Korean Patent Application No. 10-2009-0112376, filed on Nov. 20, 2009 in the Korean Intellectual Property Office, the disclosures of which is incorporated herein in its entirety by reference.

BACKGROUND OF THE INVENTION

1. Field of the Invention

One or more aspects of the present invention relate to anti-virus protection systems and methods, and more particularly, to anti-virus protection systems and methods, in which scanning and/or filtering are/is performed on malignant virus in a service server so as to minimally use a restrictive memory and central process unit (CPU) resource of a mobile device.

2. Description of the Related Art

Recently, users have to be careful because undesired software is installed in a system, or the system are hijacked simply by being linked with famous searching web pages, or clicking images, as well as by opening attached files, and downloading software.

A wireless communication system is less dependent upon an operating system (OS) and a file system, and treats less important data, than a computer. Accordingly, so far, mobile virus in the wireless communication system has not been recognized as a serious problem, and also damage due to the mobile virus has not been serious.

However, currently, wireless terminals have been developed as smart phones by employing various functions of computers, and wireless networks of wireless terminals have been enlarged so as to correspond to the Internet. Thus, virus may also be likely to damage the wireless network of the wireless terminal, like in computers.

In addition, as users able to perform stock exchanges and bank accounts by using wireless terminals, damage due to mobile virus may be gradually increased. In addition, the damage may more affect wireless terminals, than computers, security of wireless terminals is one of most important issues.

An anti-virus system of a mobile device downloads an entire virus database DB from a server in order to update the virus DB in the mobile device. Thus, a large amount of data traffic is transmitted between servers and devices, communication resources are wasted. In addition, it is difficult to use a mobile communication due to restrictive resources of the mobile device.

In addition, mobile communication environments have been globalized, and roaming services have been introduced all over the world. Thus, in a conventional anti-virus system, system may not be effectively protected from virus generated for each respective country.

SUMMARY OF THE INVENTION

One or more aspects of the present invention provide to anti-virus protection systems and methods, in which scanning and/or filtering are/is performed on malignant virus in a service server so as to minimally use a restrictive memory and central process unit (CPU) resource of a mobile device, and servers and mobile devices used in the anti-virus protection systems.

One or more aspects of the present invention provide computer readable recording media having recorded thereon a program for executing anti-virus protection methods in which scanning and/or filtering are/is performed on malignant virus in a service server so as to minimally use a restrictive memory and central process unit (CPU) resource of a mobile device.

According to an aspect of the present invention, there is provided an anti-virus protection system including a device for writing a request message for requesting data stored in a data server, and for transmitting the request message to a network, according to a request of a user to transmit the data stored in the data server; and a service server for receiving the request message, for requesting the data server for the data, according to the request message, and for receiving the data from the data server, wherein the service server performs at least one of i) determining whether the data transmitted from the data server contains malignant virus, and ii) determining whether the data server corresponds to a server violating a predetermined policy.

According to another aspect of the present invention, there is provided a mobile device including a user interface for receiving from a user a request to transmit data stored in a data server; a storage unit for storing an address of a service server; and a redirection module for writing a request message to be transmitted to the service server having the address stored in the storage unit, and for transmitting the request message to a network.

According to another aspect of the present invention, there is provided a service server including a redirect server for receiving from a device a request message for requesting data stored in a data server, for requesting the data server indicated by the received request message for data, and for receiving the data from the data server; and an anti-virus server for determining whether the data transmitted from the data server contains malignant virus, wherein, when the anti-virus server determines that the data does not contain malignant virus, the redirect server requests the data server to transmit the data to the data server.

According to another aspect of the present invention, there is provided an anti-virus protection method including receiving a request of a user to transmit data stored in a data server; writing a request message for requesting the data stored in the data server, and transmitting the request message to a service server; and in the service server, performing at least one of i) requesting the data server for the data requested by the user, receiving the data from the data server, and determining whether the transmitted data contains malignant virus, and ii) determining whether the data server violates a predetermined policy.

BRIEF DESCRIPTION OF THE DRAWINGS

The above and other features and advantages of the present invention will become more apparent by describing in detail exemplary embodiments thereof with reference to the attached drawings in which:

FIG. 6 is a flowchart for explaining a method of updating a location determining module, according to an embodiment of the present invention.

DETAILED DESCRIPTION OF THE INVENTION

Figure 1:
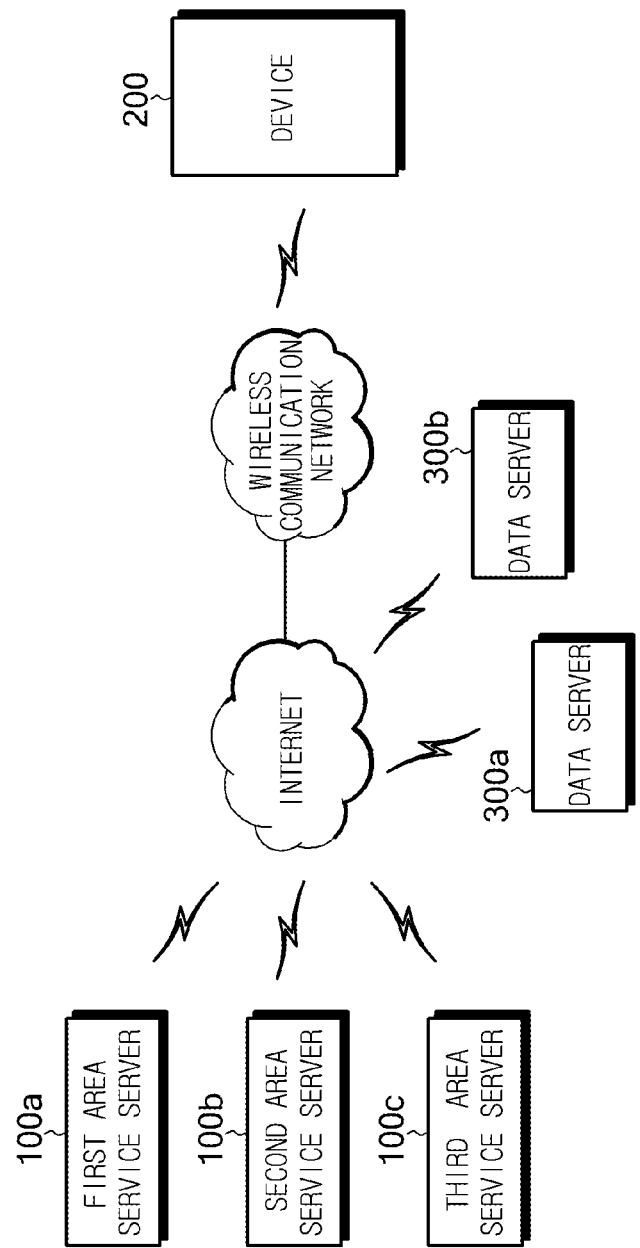
FIG. 1 is a block diagram of an anti-virus protection system according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted. As used herein, the term "and/or" includes any and all combinations of one or more of the associated listed items.

DEFINITION OF TERMINOLOGIES

Terminologies user herein are defined as follows.

The terminology "uniform resource locator (URL)" indicates a document or file in a server, or indicates a file or mail address in a FTP server.

The terminology "web server" is a device in which software for performing a web service and/or server software for performing a web service are/is executed.

A "request message" includes a 'universal resource identifier (URI)' and a 'method', and refers to a message indicating 'what' and 'how'. In this case, the 'what' corresponds to the URI, and the 'how' corresponds to the 'method'.

An "anti-virus protection system" refers to a 'malignant web and virus filtering system' and/or a 'malignant web and virus scanning system'.

An "anti-virus protection method" refers to a 'malignant web and anti-virus scanning method' and/or a 'malignant web anti-virus filtering method'.

A "client" refers to a 'web and virus filtering client' and/or a 'web and virus scanning client'.

FIG. 1 is a block diagram of an anti-virus protection system according to an embodiment of the present invention.

Referring to FIG. 1, the anti-virus protection system according to the present embodiment includes first, second and third area service servers 100a, 100b and 100c for providing anti-virus protection service, data servers 300a and 300b, and a device 200.

The device 200 may receive a request to transmit data stored in at least one of the data servers 300a and 300b from a user. The device 200 may be a mobile device, for example, a personal digital assistant (PDA), a cellular phone, a smart phone, or a notebook computer.

The device 200 writes a request message for requesting data stored in a desired data server, and transmits the request message to a network (e.g., the Internet and/or a wireless communication network), according to the user's request.

According to an embodiment of the present invention, the device 200 may receive an address (e.g., a URL) of a predetermined data server from the user, may write the request message transmitted to a 'service server for providing anti-virus protection service' (hereinafter, referred to as a 'service server') (e.g., the first area service server 100a), and may transmit the request message to the network. In this case, the request message includes an address of the data server, which is input by the user, and is transmitted to any one of the first, second and third area service servers 100a, 100b and 100c.

The device 200 previously stores an address of a service server proper to an area where the device 200 is currently positioned. When the device 200 receives an address of a predetermined data server from the user, the device 200 may transmit a request message to a service server having the address that is previously stored in the device 200.

For example, it is assumed that the first area service server 100a is in charge of a Korea area, the second area service server 100b is in charge of a US area, and the third area service server 100c is in charge of a Europe area. If the device 200 is positioned in the Korea area when transmitting the request message, an address of the first area service server 100a is previously stored in the device 200, and thus the device 200 may transmit the request message to the first area service server 100a based on the stored address.

However, when the device 200 is positioned in the US area, the address of the first area service server 100a may be previously stored in the device 200. In this case, the device 200 needs to update the address of the first area service server 100a, which is previously stored in the device 200, to an address of a service server (i.e., the second area service server 100b) proper to the US area in which the device 200 is currently positioned. Since the device 200 stores information (e.g., global positioning system (GPS) information, roaming information, or access point (AP) information) about a position of the device 200 itself, the device may obtain the address of the service server proper to an area where the device 200 itself is positioned.

In detail, when it is assumed that the device 200 is positioned in the US area, and that the address of the service server, which is previously stored in the device 200, is an address of the first area service server 100a, and an operation of updating the address of the service server will now be described. First, the device 200 transmits the request message to the first area service server 100a since the address of the first area service server 100a is previously stored in the device 200. When transmitting the request message to the first area service server 100a, the device 200 may also transmit information about a location of the device 200 to the first area service server 100a. The first area service server 100a may recognize the device 200 stores an address of a service server that is not proper to the location of the device 200 with reference to the information about the location of the device, may determine an address of a service server (that is, the second area service server 100b) proper to the location of the device 200, and may transmit the address to the device 200. The device 200 updates the address of the first area service server 100a, which is previously stored in the device 200, to the address of the service server (that is, the address of the second area service server 100b), which is received from the first area service server 100a. Prior to updating the address of the service server, the device 200 determines whether the information about the location of the device 200, which is previously stored in the device 200, corresponds to the address of the service server, which is received from the first area service server 100a. When it is determined that the information corresponds to the address, the device 200 performs the update. Then, the device 200 transmits the request message to the second area service server 100b.

A service server (e.g., the first area service server 100a) that receives the request message from the device 200 may analyze the request message, may write a request message for requesting a data server (e.g., the data server 300a) for data according to the analysis result, and may transmit the written request message to the data server 300a. Then, when the first area service server 100a receives the data from the data server 300a, the first area service server 100a may determine whether the received data contains malignant virus.

For example, when the data server 300a is a web server, an address of the data server 300a may be a URL. The first area service server 100a may obtain the URL of the data server 300a, which is included in the request message, by analyzing the request message received from the device 200. The first area service server 100a writes a request message to be transmitted to the data server 300a having the URL. The first area service server 100a may transmit the written request message to the data server 300a, and may receive desired data from the data server 300a. Then, the first area service server 100a may determine whether the data received from the data server 300a contains malignant virus.

The data servers 300a and 300b store and manage data. When receiving a request to transmit data from the first, second and third area service servers 100a, 100b and 100c, the data servers 300a and 300b may transmit data to the first, second and third area service servers 100a, 100b and 100c.

According to an embodiment of the present invention, when receiving a request to transmit data from the device 200, the first area service server 100a may perform any one of the following operations.

First, the first area service server 100a may analyze the request received from the device 200, and may determine whether a data server (e.g., the data server 300a) having an address included in the request violates a predetermined policy. In this case, the predetermined policy is used to determine whether the data server corresponds to a malignant website, for example. When it is determined that the data server 300a is not a malignant website, the first area service server 100a writes a request to transmit data of the data server 300a, and transmits the written request to the data server 300a. Then, the first area service server 100a determines whether the data received from the data server 300a contains malignant virus.

In this case, a malignant website list may be stored in the first area service server 100a, or may be stored in an external device, but not in the first area service server 100a. If the malignant website list is stored in the external device, the first area service server 100a receive the malignant website list from the external device when determining whether the data server 300a is a malignant website, or alternatively, the first area service server 100a receive the malignant website list from the external device periodically, or non-periodically.

Second, the first area service server 100a analyzes a request received from the device 200, and finds an address of a data server, which is included in the request. For example, when the request received from the device 200 includes an address of the data server 300a, the first area service server 100a writes a request to transmit data, and transmits the written request to the data server 300a. Then, the first area service server 100a determines whether data received from the data server 300a contains malignant virus.

As the analysis result, when the data contains malignant virus, the first area service server 100a notifies the device 200 about this fact.

When the data does not contain malignant virus, the first area service server 100a may request the data server 300a to transmit data to the device 200. In this case, the data server 300a transmits the data directly to the device 200, but not through the first area service server 100a (refer to an embodiment shown in FIG. 4). Alternatively, the first area service server 100a may receive data from the data server 300a, and may transmit the data to the device 200 (refer to an embodiment shown in FIG. 2). Likewise, the first area service server 100a may make the data server 300a transmit data directly to the device 200 (hereinafter, referred to as 'scanning option'), and also, the first area service server 100a may receive data from the data server 300a and may transmit the data to the device 200 (hereinafter, referred to as 'filtering option').

According to an embodiment of the present invention, the scanning option and the filtering option may be selected according to a user's request, or alternatively, a predetermined option may be performed without any user's request.

A case where the scanning option and the filtering option may be selected according to the user's request will now be described. When receiving a request to transmit data from the user, the device 200 may receive selection of the scanning option or the filtering option. In this case, when the device 200 writes a request message for requesting for transmission of data, the request message may contain information about an option selected by the user. A service server may analyze the request message received from the device 200, may find an option selected by the user, and may perform the scanning option or the filtering option according to the option selected by the user.

The first area service server 100a may determine whether the data received from the data server 300a contains malignant virus, and may transmit the determination result to the device 200.

Figure 2:
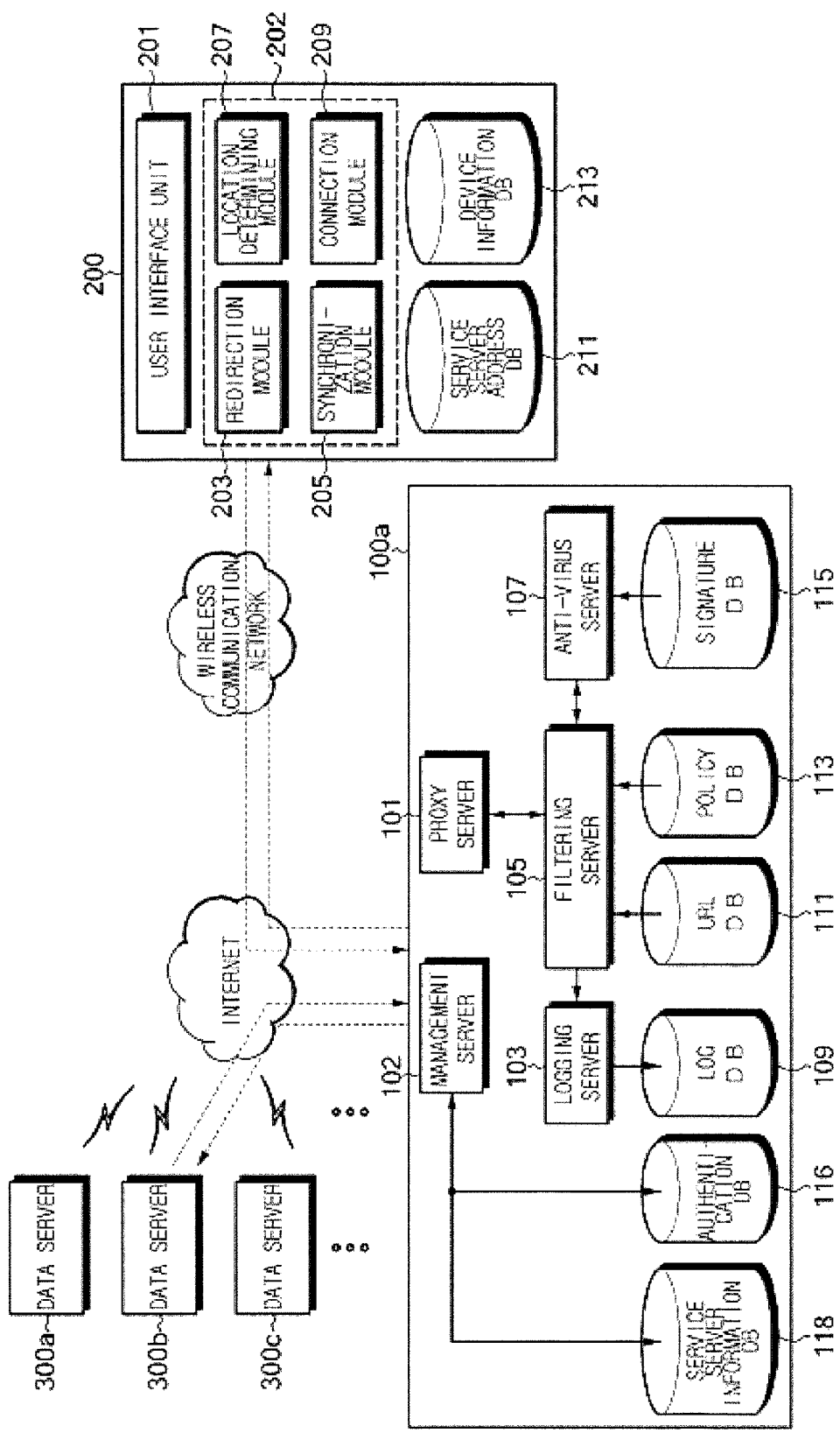
FIG. 2 is a functional block diagram of a malignant web and virus filtering system, according to another embodiment of the present invention.

As described above, the first area service server 100a may always receive data from a data server, and may forward the received data to the device 200 (i.e., the 'filtering option'), like a 'malignant web and virus filtering system' illustrated in FIG. 2. Alternatively, the first area service server 100a may make the data server transmit data directly to the device 200, like a 'malignant web and virus scanning system' illustrated in FIG. 4. These methods will be described in more detail with reference to relevant drawings.

In FIG. 1, three area serves are shown, but less than, or more than three servers may be used. In addition, two data servers are shown, but more than two data servers may be used.

FIG. 2 is a functional block diagram of a malignant web and virus filtering system, according to another embodiment of the present invention.

Referring to FIG. 2, the malignant web and virus filtering system according to the present embodiment includes a service server 100a, data servers 300a, 300b, 300c, etc., and a mobile device 200.

According to an embodiment of the present invention, the mobile device 200 may include a user interface unit 201, a mobile web and virus filtering client 202, a service server address DB 211, and a device information DB 213. In this case, the mobile web and virus filtering client 202 (hereinafter, referred to as a 'client 202') may include a redirection module 203, a synchronization module 205, a location determining module 207, and a connection module 209.

The user interface unit 201 may receive an address (e.g., a URL) of a data server from which data is to be obtained, from a user. In this case, the data includes both an executable file, and includes data regarding a text, an image, or a moving picture. When the service server 100a is able to execute both scanning option and filtering option, the user interface unit 201 may receive selection between the scanning option and the filtering option from the user. Information about the selection may be included in a request message, or may be transmitted to the service server 100a, together with the request message.

The client 202 performs an overall operation for malignant web and virus scanning, in conjunction with the service server 100a.

When the redirection module 203 receives an address of a data server from the user, the redirection module 203 may write a request message to be transmitted to the service server 100a. In this case, the request message is written so as to be transmitted to the service server 100a, and includes the address (e.g., a URL) of a data server input by the user.

The location determining module 207 may determine whether an address of a service server stored in the mobile device 200, matches the current location of the mobile device 200, with reference to an address of the service server 100a, which is stored in the service server address DB 211, and information about the location of the mobile device 200, which is stored in the device information DB 213.

The redirection module 203 may write the request message, and may transmit the request message to the service server 100a. The redirection module 203 may write the request message with reference to the address of the service server 100a, which is stored in the service server address DB 211.

The connection module 209 may support communication with the service server 100a. For example, the connection module 209 sets a communication path for communication between the service server 100a and the mobile device 200 (for example, the connection module 209 may set a communication socket between the service server 100a and the mobile device 200).

The synchronization module 205 may update an entire portion or a portion of the location determining module 207. In addition, the synchronization module 205 compares a version of a location determining module (not shown), which is previously stored in the service server 100a, with the location determining module 207 stored in the mobile device 200. As the comparison result, when the location determining module 207 stored in the mobile device 200 is an old version, the location determining module 207 stored in the mobile device 200 may be updated to the location determining module, which is previously stored in the service server 100a.

The service server address DB 211 is a storage unit for storing the address of the service server 100a. As described above, the request message to be transmitted to the address of the service server 100a, which is stored in the service server address DB 211, is written by the redirection module 203.

A service server is determined according to proximity between the mobile device 200 and the service server. That is, the mobile device 200 is connected to a service server that is closest to the mobile device 200.

According to an embodiment of the present invention, the service server 100a includes a proxy server 101, a management server 102, a filtering server 105, an anti-virus server 107, a logging server 103, a log DB 109, a URL DB 111, a policy DB 113, a signature DB 115, an authentication DB 116, and a service server information DB 118.

The proxy server 101 receives the request message transmitted by the mobile device 200, write a request message, transmits the written request message to the data server (for example, the data server 300a) having the address input by the user, and receives data determined according to the address from the data server 300a. The data determined according to the address may include an executable file, a non-executable file, a text file, a moving picture data, image data, or XML data.

According to an embodiment of the present invention, the proxy server 101 includes a cache memory, and may previously store an address of a data server which the mobile device 200 accesses frequently, in the cache memory in order to provide fast service. Thus, when receiving a request from the mobile device 200, the proxy server 101 determines whether an address included in the request matches the address stored in the cache memory. As the determination result, when the address included in the request matches the address of the cache memory, data stored in the cache memory is transmitted to the mobile device 200. However, as the determination result, when the address included in the request does not match the address stored in the cache memory, the proxy server 101 may request a data server for transmission of data.

The management server 102 performs authentication, manages a version of the client 202, determines whether to change a location of the mobile device 200, and updates the client 202. The management server 102 may perform authentication on the mobile device 200 connected to the service server 100a, with reference to data stored in the authentication DB 116 and the service server information DB 118, and may check the version of the client 202. When the management server 102 determines that the version the client 202 is changed, data for updating is extracted from the authentication DB 116 and the service server information DB 118, and is transmitted to the mobile device 200.

In addition, the management server 102 checks the location of the mobile device 200 based on data (i.e., information about the location of the mobile device 200) transmitted from the mobile device 200. As a result, when the management server 102 determines that the location of the mobile device 200 is changed, the management server 102 may determine an address of a service server proper to the changed location, and may transmit the address of the service server to the mobile device 200.

In addition, the filtering server 105 may determine whether an address of a data server, which is contained in a request message transmitted from the mobile device 200, corresponds to an address of a web site to which access is blocked, with reference to data stored in the URL DB 111.

The anti-virus server 107 may determine whether data transmitted from the data server 300a contains malignant virus. For example, the anti-virus server 107 may determines whether the data contains malignant virus by comparing a signature stored in the signature DB 115 with the data transmitted from the data server 300a.

According to an embodiment of the present invention, the proxy server 101 transmits the address of the data server, which is contained in the request message transmitted from the mobile device 200, to the filtering server 105. The filtering server 105 determines whether the data server corresponds to a malignant web site, with reference to data stored in the policy DB 113 and the URL DB 111, and transmits the determination result to the proxy server 101. When it is determined that the data server corresponds to malignant web site, the proxy server 101 transmits the determination result to the mobile device 200. When it is determined that the data server does not correspond to malignant web site, the proxy server 101 may write a request to transmit data of the data server 300a, and may the written request to the data server 300a.

Then, the proxy server 101 transmits data transmitted from the data server 300a to the filtering server 105. The filtering server 105 transmits the data transmitted from the proxy server 101 to the anti-virus server 107. The anti-virus server 107 determines whether the data transmitted from the filtering server 105 contains malignant virus, and transmits the determination result to the filtering server 105.

Then, the filtering server 105 transmits the determination result transmitted from the data server 300a to the proxy server 101. In this case, when it is determined that the data transmitted from the data server 300*a* does not contain malignant virus, the proxy server 101 transmits the data transmitted from the data server 300*a* to the mobile device 200.

The logging server 103 keeps storing in the log DB 109 a filtering result, and a result regarding whether data contains malignant virus.

The URL DB 111 stores a URL of a malignant web site, or a URL of a web site to which access needs to be blocked according to a predetermined policy.

The policy DB 113 stores a policy used for the filtering server 105 to perform filtering. The filtering server 105 determines whether filtering is performed on a web site, with reference to the policy stored in the policy DB 113. In this case, the policy corresponds to blocking addresses of web sites stored in the URL DB 111.

The signature DB 115 stores the signature for identifying malignant virus. The anti-virus server 107 determines whether the data transmitted from the data server 300*a* contains malignant virus by determining whether the data contains the signature, with reference to data stored in the signature DB 115.

The authentication DB 116 stores authentication data for identifying the mobile device 200, the version of the client 202, and data for updating the client 202. In this case, the data for updating the client 202 includes data for updating the location determining module 207, and an entire portion or a portion of the client 202.

The service server information DB 118 stores addresses of service servers proper to each respective location of the mobile device 200.

The management server 102 determines whether the location determining module 207 needs to be updated. When it is determined that the location determining module 207 needs to be updated, the management server 102 transmits the data for updating the location determining module 207 to the mobile device 200. In addition, the management server 102 determines whether the address of the service server 100*a* stored in the service server address DB 211 needs to be changed. If the address of the service server 100*a* needs to be changed, the management server 102 determines a service server proper to the current location of the mobile device 200, with reference to data stored in the service server information DB 118. The management server 102 transmits an address of the determined service server to the mobile device 200.

According to an embodiment of the present invention, when determining a service server proper to the current location of the mobile device 200, the management server 102 may determine a service server that is closest to the current location of the mobile device 200 as the service server proper to the current location of the mobile server 200.

The synchronization module 205 of the mobile device 200 may update data that is previously stored in the mobile device 200 to the data for updating the client 202, which is transmitted from the management server 102. In addition, when the synchronization module 205 of the mobile device 200 receives an address of a new service server, the synchronization module 205 updates an address of a service server, which is previously stored in the service server address DB 211, to the address of the new service server.

According to an embodiment of the present invention, when the address stored in the service server address DB 211 is updated to the address of the new service server by the synchronization module 205, the location determining module 207 determines whether the address of the new service server is proper, with reference to information (e.g., GPS information, AP information, and roaming information) about the location of the mobile device 200, which is stored in the device information DB 213. When the location determining module 207 determines that the address of the new service server is proper, the redirection module 203 generates a request message with reference to the address of the new service server, which is stored in the service server address DB 211.

When the location determining module 207 determines that the address of the new service server is not proper, the synchronization module 205 may request the service server 100*a* for an address of a service server proper to the location of the mobile device 200 while transmitting the information about the address of the device 200, which is stored in the device information DB 213. Then, the service server 100*a* performs the above-described operation again so as to determine the address of the service server proper to the location of the mobile device 200, and transmits the address of the service to the mobile device 200. Then, the above-described operation may be repeatedly performed.

Figure 3:
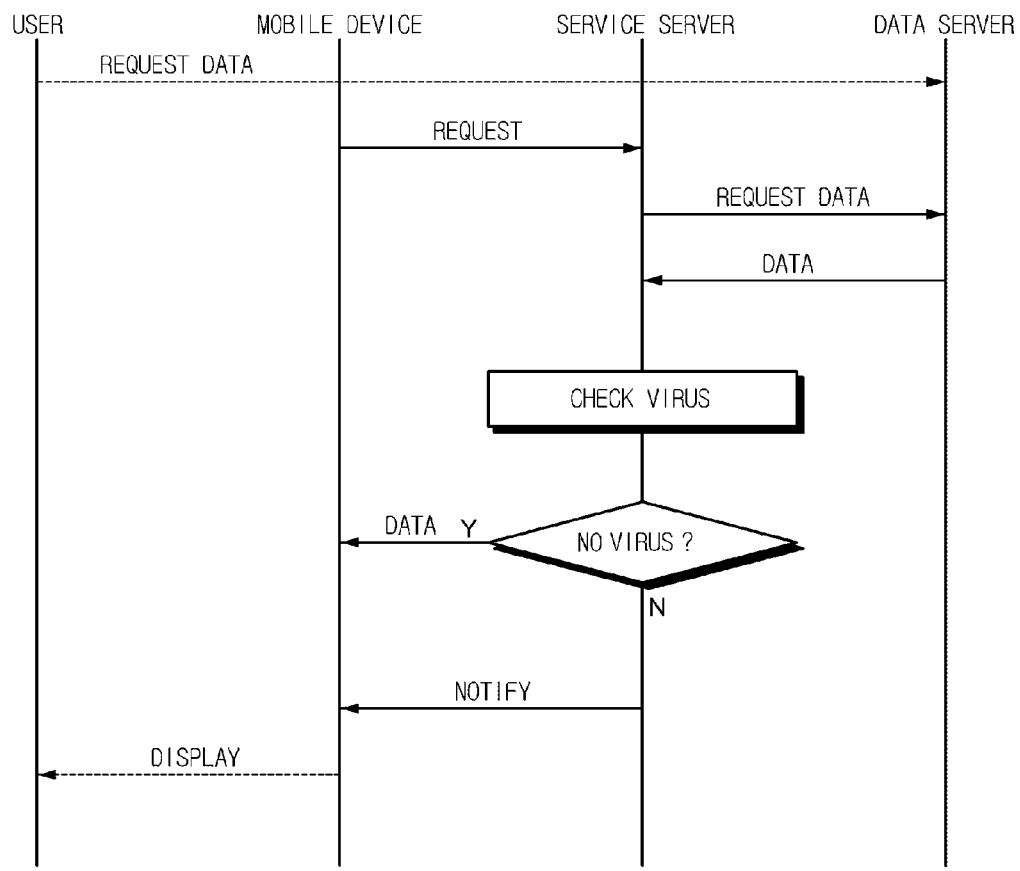
FIG. 3 is a flowchart for explaining a malignant web and virus filtering method, according to an embodiment of the present invention.

FIG. 3 is a flowchart for explaining a malignant web and virus filtering method, according to an embodiment of the present invention.

Referring to FIGS. 2 and 3, when receiving an address of a data server from which data is to be obtained, through the user interface unit 201 from a user, the mobile device 200 generates a request message to be transmitted to the service server 100*a*, and transmits the request message to a network, instead of transmitting the request message directly to the data server 300*a*. In this case, the network includes the Internet, a wireless communication network, and the like, and includes any communication network connecting the mobile device 200, the data server 300*a*, and the service server 100*a* to each other.

The filtering server 105 of the service server 100*a* determines whether an address input by the user, which is included in the request message transmitted from the mobile device 200, corresponds to a malignant web site. When it is determined that the address does not correspond to the malignant web site, the proxy server 101 rewrites a request message to be transmitted to the data server 300*a*, and transmits the written request message to a network.

When the proxy server 101 receives data from the data server 300*a*, the anti-virus server 107 determines whether the data transmitted from the data server 300*a* contains malignant virus.

Then, when the data does not violate a predetermined policy, and does not contain malignant virus, the proxy server 101 transmits the data transmitted from the data server 300*a* to the mobile device 200. On the other hand, when the data violates the predetermined policy, or contains malignant virus, the proxy server 101 notifies the mobile device 200 about this fact.

Figure 4:
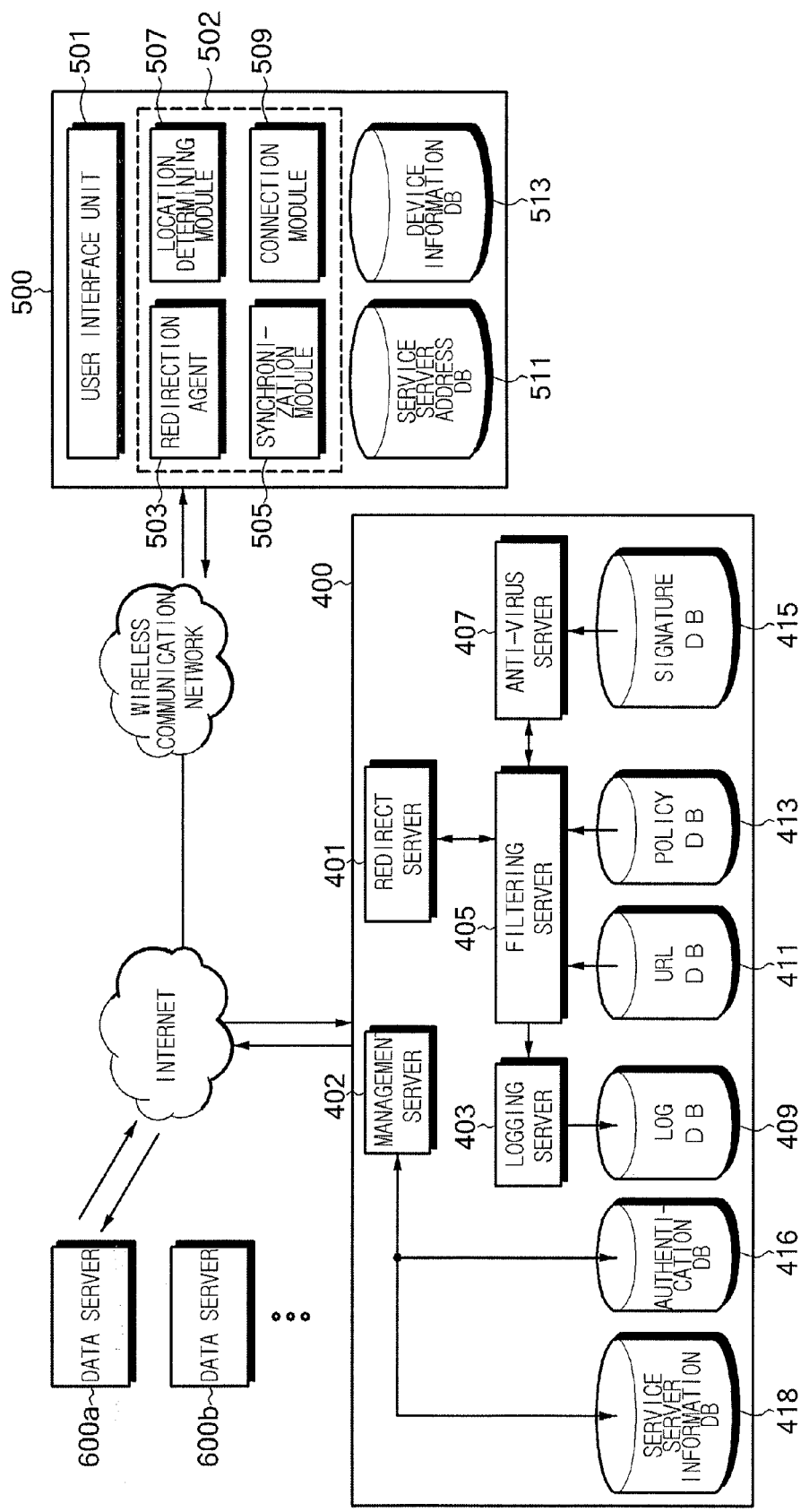
FIG. 4 is a functional block diagram of a malignant web and virus scanning system, according to an embodiment of the present invention.

FIG. 4 is a functional block diagram of a malignant web and virus scanning system, according to an embodiment of the present invention.

Referring to FIG. 4, the malignant web and virus scanning system according to the present embodiment includes a service server 400, data servers 600*a*, 600*b*, 600*c*, etc., and a mobile device 500.

According to an embodiment of the present invention, the mobile device 500 includes a user interface 501, a mobile web and virus scanning client 502, a service server address DB 511, and a device information DB 513. In this case, the mobile web and virus scanning client 502 (hereinafter, referred to as the 'client 502') may include a redirection agent 503, a synchronization 505, a location determining module 507, and a connection module 509.

Comparing the malignant web and virus scanning system of FIG. 4 with the malignant web and virus filtering system of FIG. 2, the service server 400, the data servers 600a, 600b, 600c, etc., and the mobile device 500 correspond to the service server 100a, the data servers 300a, 300b, 300c, etc., and the mobile device 200, respectively. The user interface 501, the mobile web and virus scanning client 502, the service server address DB 511, and the device information DB 513 correspond to the user interface unit 201, the mobile web and virus filtering client 202, the service server address DB 211, and the device information DB 213, respectively. The redirection agent 503, the synchronization 505, the location determining module 507, and a connection module 509 correspond to the redirection module 203, the synchronization module 205, the location determining module 207, and the connection module 209, respectively. The corresponding components have the same or similar functions, and thus components of FIG. 4 will be described in terms of differences from the malignant web and virus filtering system of FIG. 2.

The user interface 501 may receive a request to transmit data from a user, and the request includes an address of a data server from which data is to be obtained.

When receiving the address of the data server from the user, the redirection agent 503 writes a request message to be transmitted to the service server 400. In this case, the request message is written so as to be transmitted to the service server 400, and includes the address of the data server input by the user.

According to an embodiment of the present invention, when receiving the request to transmit data from the user, the redirection agent 503 may write the request message to be transmitted to the service server 400 with reference to an address of a service server (i.e., the service server 400 according to the present embodiment) stored in the service server address DB 511.

According to an embodiment of the present invention, the service server 400 includes a redirect server 401, a management server 402, the scanning server 405, an anti-virus server 407, a logging server 403, a log DB 409, a URL DB 411, a policy DB 413, a signature DB 415, an authentication DB 416, and a service server DB 418.

Comparing the malignant web and virus scanning system of FIG. 4 with the malignant web and virus filtering system of FIG. 2, the redirect server 401, the management server 402, a scanning server 405, the anti-virus server 407, the logging server 403, the log DB 409, the URL DB 411, the policy DB 413, the signature DB 415, the authentication DB 416, and the service server DB 418 correspond to the proxy server 101, the management server 102, the filtering server 105, the anti-virus server 107, the logging server 103, the log DB 109, the URL DB 111, the policy DB 113, the signature DB 115, the authentication DB 116, and the service server DB 418, respectively. The corresponding components have the same or similar functions, and thus components of FIG. 4 will be described in terms of differences from the malignant web and virus filtering system of FIG. 2.

The redirect server 401 receives a request message transmitted from the mobile device 500.

The scanning server 405 determines whether an address of a data server, which is contained in the request message transmitted from the mobile device 500 to the redirect server 401, corresponds to a web site violating a predetermined policy. For example, the scanning server 405 may determine the address of the data server, which is contained in the request message transmitted from the mobile device 500, corresponds to a malignant web site, with reference to data stored in the policy DB 413 and the URL DB 411.

When the scanning server 405 determines that 'the data server is a malignant web site', the redirect server 401 notifies the mobile device 500 about this fact. When the scanning server 405 determines that the data server is not a malignant web site, the redirect server 401 generates a request for requesting the data server to transmit data, and transmits the request message to the data server.

According to an embodiment of the present invention, the redirect server 401 transmits data transmitted from the data server 600a to the anti-virus server 407. The anti-virus server 407 determines whether the data transmitted from the scanning server 405 contains malignant virus, and transmits the data to the redirect server 401.

When it is determines that the data does not contain malignant virus, the redirect server 401 requests the data server 600a to transmit the data directly to the mobile device 500. The data server 600a transmits the data directly to the mobile device 500, according to the request of the redirect server 401.

The logging server 403 keeps storing in the log DB 109 a scanning result, and a result regarding whether data contains malignant virus.

The policy DB 413 stores a predetermined policy used for the scanning server 405 to perform scanning. The scanning server 405 determines whether scanning is performed on a data server with reference to the policy stored in the policy DB 413.

Figure 5:
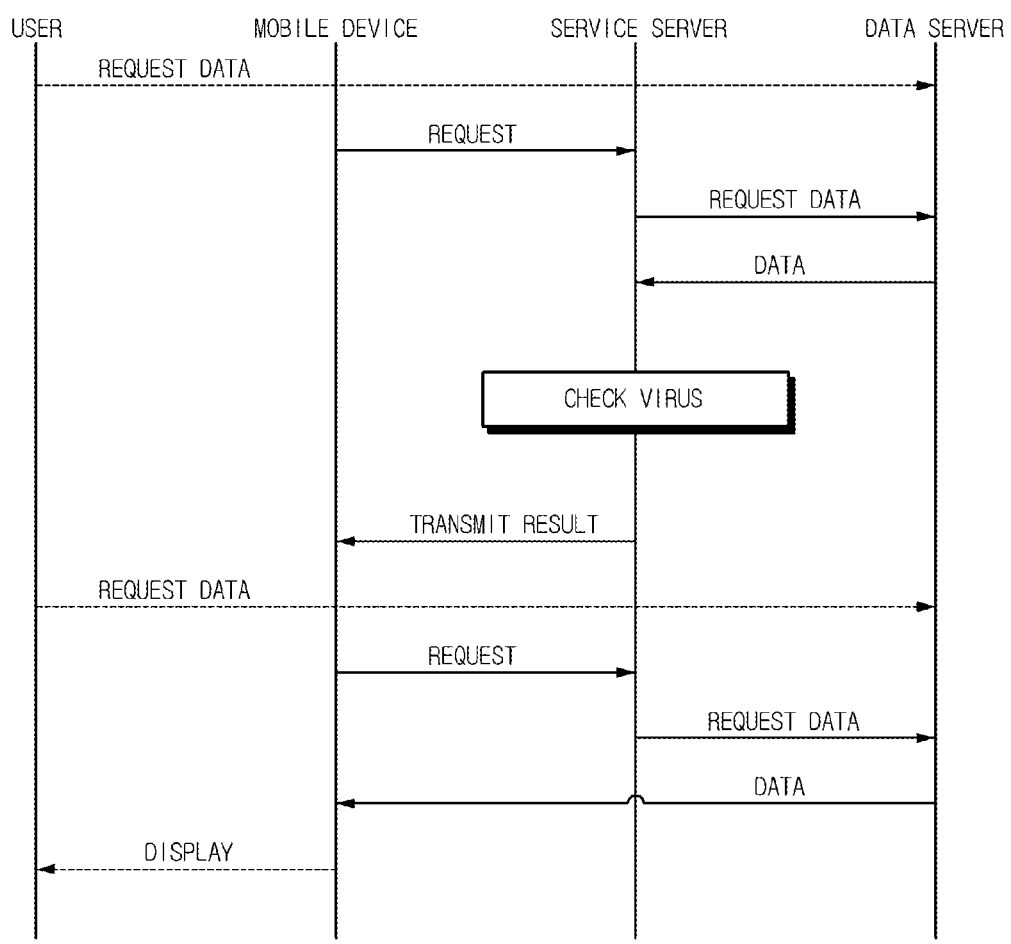
FIG. 5 is a flowchart for explaining a malignant web and virus scanning method, according to an embodiment of the present invention.

FIG. 5 is a flowchart for explaining a malignant web and virus scanning method, according to an embodiment of the present invention.

Referring to FIGS. 4 and 5, when receiving an address of a data server from which data is to be obtained, through the user interface unit 501 from a user, the mobile device 500 generates a request message to be transmitted, and transmits the request message to a network, instead of transmitting the request message directly to the data server 600a.

The redirect server 401 of the service server 400 may determine whether an address of a data server input by the user, which is included in the request message transmitted from the mobile device 500, corresponds to a web site violating a predetermined policy. If the data server does not violate the predetermined policy, the redirect server 401 writes a request to be transmitted to the data server 600a, and transmits the request to a network. When the redirect server 401 receives data from the data server 600a, the anti-virus server 407 determines whether the data transmitted from the data server 600a contains malignant virus.

The redirect server 401 may transmits the determination results of the scanning server 405 and the anti-virus server 407 to the mobile device 500. Then, as the determination results of the scanning server 405 and the anti-virus server 407, when it is determined that the data server 600a is not a malignant web site, and does not contain malignant virus, the redirect server 401 requests the data server 600a to transmit data directly to the mobile device 500. Then, the data server 600a may transmit the data directly to the mobile device 500.

The malignant web and virus filtering system described with reference to FIG. 4, and the malignant web and virus filtering system described with reference to FIG. 2 may be integrated together. For example, various DBs (e.g., an authentication DB, a log DB, a URL DB, a policy DB, and a signature DB) may store data required to support both the scanning system and the filtering system. The filtering server 105 may further perform a function of the scanning server 405. The proxy server 101 may further perform a function of the redirect server 401. In addition, the client 202 may further perform a function of the client 502. Likewise, the integrated system may perform the malignant web and virus scanning or filtering, according to a user's selection. When the user selects the scanning option or the filtering option, a redirection module may add selection information to the request message, or may transmit the selection information together with the request message. A service server may determine whether the scanning or filtering is performed, with reference to the selection information. In addition, as the determination result, the service server may perform the scanning or filtering.

They above embodiments of the present invention may be embodied based on cloud service. In this case, service servers may be cloud servers. In addition, a data server is a web server, but the present embodiment is not limited thereto.

FIG. 6 is a flowchart for explaining a method of updating a location determining module, according to an embodiment of the present invention. In detail, an example of a method of determining a service server that is closest to the current activated location of the wireless device will now de described.

Referring to FIGS. 3 and 6, in a mobile device, the client 202 checks the current activated location of the mobile device, according to a predetermined policy, or portion (operation S401). Information about the mobile device is collected by the client 202, and is transmitted to the service server 100a (S403). According to an embodiment of the present invention, the information about the mobile device may include, for example, checksum information of the location determining module, an execution environment (e.g., an operating system) of the mobile device, and/or information about the current activated location of the mobile device.

The management server 102 determines whether the location determining module is changed (S405). According to an embodiment of the present invention, the management server 102 may determine whether the location determining module is changed, by using the checksum information of the location determining module, which is received from the client 202.

When the location determining module is changed (S405-Y), the management server 102 selects data for updating the location determining module proper to the execution environment of the mobile device 200 according to information about the mobile device, which is transmitted from the mobile device 200, and transmits the data for updating the location determining module to the mobile device 200 (S407).

The mobile device 200 updates the previous location determining module 207 by using the data for updating the location determining module, which is transmitted from the management server 102 (S409), and executes the updated location determining module (S411). Then, the method returns back to operation S401 so as to periodically determine whether the location determining module is changed.

When there is no change in the location determining module, information stored in the service server address DB 211 or the device information DB 213 is updated (S415).

So far, the method of updating the location determining module has been described with FIG. 2, but may be applied to the malignant web and virus scanning system of FIG. 4.

In FIGS. 2 and 4, the log DBs 109 and 409, the URL DB 111 and 411, the policy DBs 113 and 413, the signature DBs 115 and 415, authentication DBs 116 and 416, the service server information DBs 118 and 418 are embodied as separate functions. However, this configuration is exemplary only, and thus the above-described DBs may be integrated together, or alternatively, may be divided in more detail. In addition, the service server address DB 211 and the device information DB 213 of the mobile device 200 may also be integrated together to at least one DB, or alternatively, may be divided in more detail.

In addition, other embodiments of the present invention can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An anti-virus protection system comprising:
   a device configured to generate a first request message requesting data stored in a data server, and transmit the first request message to a network, according to a request, by a user, to transmit the data stored in the data server; and
   a service server configured to receive the first request message, generate and transmit to the data server a second request message requesting the data server to transmit the data according to the first request message, and receive the data from the data server,
   wherein the service server performs at least one of i) determining whether the data transmitted from the data server contains a malignant virus, or ii) determining whether the data server corresponds to a server violating a predetermined policy; and
   wherein, when the data transmitted from the data server is determined to not contain the malignant virus, the service server generates and transmits to the data server a third request message requesting the data server to transmit the data requested by the user to the device.

2. The anti-virus protection system of claim 1, wherein, when the data server receives from the service server the third request message requesting the data server to transmit the data requested by the user to the device, the data server transmits the data requested by the user directly to the device.

3. The anti-virus protection system of claim 1, wherein the first request message comprises an address of the data server.

4. A service server comprising:
   a redirect server configured to receive from a device a first request message requesting data stored in a data server, generate and transmit to the data server indicated by the received request message a second request message requesting the data server to transmit the data according to the request message, and receive the data from the data server; and
   an anti-virus server configured to determine whether the data transmitted from the data server contains a malignant virus,
   wherein, when the anti-virus server determines that the data does not contain the malignant virus, the redirect server generates and transmits to the data server a third request message requesting the data server to transmit the data to the device.

5. The service server of claim 4, further comprising a security policy server configured to determine whether the data server violates a predetermined policy.

6. The service server of claim 4, further comprising a management server configured to determine a service server proper to a location of the device,
wherein the redirect server transmits an address of the service server determined by the management server to the device.

7. An anti-virus protection method comprising:
receiving a request by a user to transmit data stored in a data server;
generating a first request message requesting the data stored in the data server, and transmitting the first request message to a service server;
in the service server, performing at least one of i) generating and transmitting to the data server a second request message requesting the data server to transmit the data according to the first request message, receiving the data from the data server, and determining whether the transmitted data contains a malignant virus, and ii) determining whether the data server violates a predetermined policy; and
when the data does not contain the malignant virus, generating and transmitting to the data server a third request message requesting the data server to transmit the data requested by the user to the device.

8. The anti-virus protection method of claim 7, further comprising, when the data server receives from the service server the third request message requesting the data server to transmit the data requested by the user to the device, transmitting the data requested by the user directly to the device.

9. The anti-virus protection method of claim 8, wherein the first request message comprises an address of the data server.

* * * * *